(12) United States Patent
Yang et al.

(10) Patent No.: US 8,396,094 B2
(45) Date of Patent: Mar. 12, 2013

(54) FREQUENCY TRACKING METHOD AND APPARATUS APPLIED TO POSITIONING SYSTEM

(75) Inventors: Tzu-Yi Yang, Hsinchu Hsien (TW); Chen Wei Ho, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 282 days.

(21) Appl. No.: 12/876,307

(22) Filed: Sep. 7, 2010

(65) Prior Publication Data

US 2011/0075705 A1 Mar. 31, 2011

(30) Foreign Application Priority Data

Sep. 29, 2009 (TW) .............................. 98133024 A

(51) Int. Cl.
*H04B 1/707* (2006.01)

(52) U.S. Cl. ........ 375/140; 375/316; 375/147; 375/148; 375/149; 375/150; 375/152; 375/344; 375/346; 375/349

(58) Field of Classification Search .................. 375/316, 375/140, 147, 148, 149, 150, 152, 344, 346, 375/349
See application file for complete search history.

(56) References Cited

U.S. PATENT DOCUMENTS

| | | | |
|---|---|---|---|
| 5,966,403 A * | 10/1999 | Pon ................................ | 375/148 |
| 6,724,343 B2 * | 4/2004 | Asher et al. ............... | 342/357.23 |
| 8,238,411 B2 * | 8/2012 | Valio et al. ..................... | 375/150 |
| 2002/0005802 A1 * | 1/2002 | Bryant et al. ............ | 342/357.01 |
| 2005/0287956 A1 * | 12/2005 | Golden et al. ............. | 455/67.16 |
| 2007/0018891 A1 * | 1/2007 | Golden et al. ................ | 342/420 |
| 2008/0238772 A1 * | 10/2008 | Soloviev et al. ......... | 342/357.14 |
| 2010/0069085 A1 * | 3/2010 | Hammes et al. ........... | 455/456.1 |
| 2010/0117884 A1 * | 5/2010 | Ahmed et al. .................. | 342/14 |

* cited by examiner

*Primary Examiner* — Siu Lee
(74) *Attorney, Agent, or Firm* — Edell, Shapiro & Finnan, LLC

(57) ABSTRACT

A frequency tracking method applied to a positioning system is provided. The method includes receiving a baseband signal, the baseband signal includes a line of sight (LOS) signal and a multipath signal; generating a cost function according to equal step frequencies, the baseband signal and a signal average energy; and generating an estimated LOS frequency according to the cost function.

12 Claims, 7 Drawing Sheets

FREQUENCY TRACKING METHOD AND APPARATUS APPLIED TO POSITIONING SYSTEM

CROSS REFERENCE TO RELATED PATENT APPLICATION

This patent application is based on Taiwan, R.O.C. patent application No. 98133024 filed on Sep. 29, 2009.

FIELD OF THE INVENTION

The present invention relates to a positioning method and apparatus, and more particularly to a frequency tracking method and apparatus applied to a positioning system.

BACKGROUND OF THE INVENTION

The Union of Soviet Socialist Republics (USSR), by launching a first satellite, Sputnik I, initiated the beginning of the space age, and space usage has gradually become an important area of research ever since. A global positioning system (GPS) was originated from a navigating system developed by the United States (US) Navy. The US Department of Defense (USDoD) continued the project and achieved a GPS by satellites.

The USDoD separated the GPS project into three stages including a research stage, a trial stage and a mature stage. The GPS was then opened to the public when the GPS entered the mature stage. Since the GPS is reliant on satellites, it is also referred to as the satellite positioning system (SPS). There are 32 GPS satellites with a period of 12 hours and a height of 20,000 kilometer (km).

In the process of receiving a satellite signal are many biases and errors. The biases have predetermined characteristics and can be represented by mathematical models, whereas the errors are randomly generated and need to be represented statistically—both the biases and errors have undesirable influence on the accuracy of the satellite positioning. One of the significant errors is a multipath effect. That is, except when receiving a satellite signal directly, i.e., a line-of-sight (LOS) signal, an antenna may also receive a satellite signal that has been reflected by objects in the environment, i.e., a multipath (MP) signal, in a way that the two signals reach the antenna at different timings. Therefore, when receiving an LOS signal and an MP signal that are superposed on each other, a receiver cannot estimate an accurate frequency because time difference and phase and/or frequency offset exist between the LOS signal and the MP signal.

Especially in a city with skyscrapers and narrow lanes, the multipath effect is quite serious, and thus poses a great challenge for the GPS that requires a high quality of measurement. It is to be noted that the prior art focused only to resolve time delay in the multipath effect. However, in a real environment, the multipath effect often includes frequency offset such that a range-rate is estimated incorrectly.

A two-path baseband signal includes the LOS signal and the MP signal, and the baseband signal r(t) can be represented as: $r(t)=A_1 c(t-\tau_1)e^{j(2\pi f_1 t+\theta_1)}+A_2 c(t-\tau_2)e^{j(2\pi f_2 t+\theta_2)}$, where $c(\tau)$ is a coarse acquisition (C/A) code, $A_1$, $f_1$, $\tau_1$ and $\theta_1$ represent a signal strength, a frequency, a delay and a phase of the LOS signal respectively, and $A_2$, $f_2$, $\tau_2$ and $\theta_2$ represent a signal amplitude, a frequency, a delay and a phase of the MP signal respectively. The C/A code is a bit sequence that represents pseudorandom noise (PN code) where the C/A code strongly correlates to itself when two same C/A codes are exactly aligned. In GPS system, each satellite has its own C/A code which will not strongly correlate with other satellites' C/A code. Signals from different satellites are transmitted with their own C/A codes. Therefore, it is desired to correlate two received baseband signals r(t) in order to recover the original transmitted signal.

According to a coherent time T, a correlation is calculated by a time-and-carrier recovered correlation of the baseband signal in a time interval from (k−1)T to kT, and a correlation result is as follows:

$$s_k(\tau,f)=(A_1 R(\tau-\tau_1)\mathrm{sinc}((f-f_1)T))^2+(A_2 R(\tau-\tau_2)\mathrm{sinc}((f-f_2)T))^2+A_1 A_2 \cos(2\pi f_\Delta kT+\theta_\Delta)R(\tau-\tau_1)R(\tau-\tau_2)\mathrm{sinc}((f-f_1)T)\mathrm{sinc}((f-f_2)T) \quad (1),$$

where $f_\Delta=f_1-f_2$, $\theta_\Delta=\theta_1-\theta_2-\pi f_\Delta T$ and $R(\tau)$ is an autocorrelation function of the C/A code.

In the prior art, multipath estimation neglects frequency dimension variations and it assumes the LOS signal and the MP signal have the same frequency so a simplified equation of Eq. (1) is obtained as follows:

$$s_k(\tau)=(A_1 R(\tau-\tau_1))^2+(A_2 R(\tau-\tau_2))^2+2A_1 A_2 \cos(\theta_\Delta)R(\tau-\tau_1)R(\tau-\tau_2) \quad (2)$$

$A_1$, $\tau_1$, $A_2$, $\tau_2$ and $\theta_\Delta$ are then estimated. As mentioned previously, the prior art cannot attend to situations where the LOS signal and the MP signal have a frequency difference.

FIG. 1 is a signal diagram of the LOS signal, the MP signal and a tracking (TRK) signal in a conventional positioning system. Ideally, a tracking signal frequency ($f_{TRK}$) is equal to an LOS signal frequency ($f_1$). However, since the prior art does not estimate a frequency influence caused by the MP signal, the recovered tracking signal frequency is shifted because of the MP signal frequency offset. A difference between the LOS signal frequency and the MP signal frequency ($f_2$) can be up to 40 Hz, and a difference between the LOS signal frequency and the TRK signal frequency can be up to 30 Hz—such differences cause the positioning system huge errors in navigating speed and direction.

Hence, a frequency tracking method and apparatus applied to a positioning system is urgently needed to improve the MP effect estimation, so as to make the frequency tracking of the positioning system more accurate.

SUMMARY OF THE INVENTION

An embodiment of the invention provide a frequency tracking method applied to a positioning system. The method comprises: receiving a baseband signal, the baseband signal comprising a line of sight (LOS) signal and a multipath (MP) signal; generating a cost function according to a plurality of equal step frequencies, the baseband signal and a signal average energy; and generating an estimated LOS signal frequency.

An embodiment of the invention further provides a frequency tracking apparatus applied to a positioning system for receiving a baseband signal. The apparatus comprises: a first multiplier, for multiplying the baseband signal with a time delay reference; a plurality of second multipliers, coupled to the first multiplier, for multiplying the baseband signal with a plurality of equal step frequencies; a plurality of correlators, coupled to the second multipliers respectively; and a plurality of accumulators, coupled to the correlators, for generating a signal average energy.

The invention further provides a frequency tracking method applied to a positioning system. The method comprises: receiving a baseband signal, the baseband signal comprising an LOS signal and an MP signal; and obtaining an estimated LOS signal frequency according to a plurality of parameters and the baseband signal.

BRIEF DESCRIPTION OF THE DRAWINGS

An embodiment of the present invention will become more readily apparent to those ordinarily skilled in the art after reviewing the following detailed description and accompanying drawings, in which.

DETAILED DESCRIPTION OF THE PREFERRED EMBODIMENT

Figure 1:
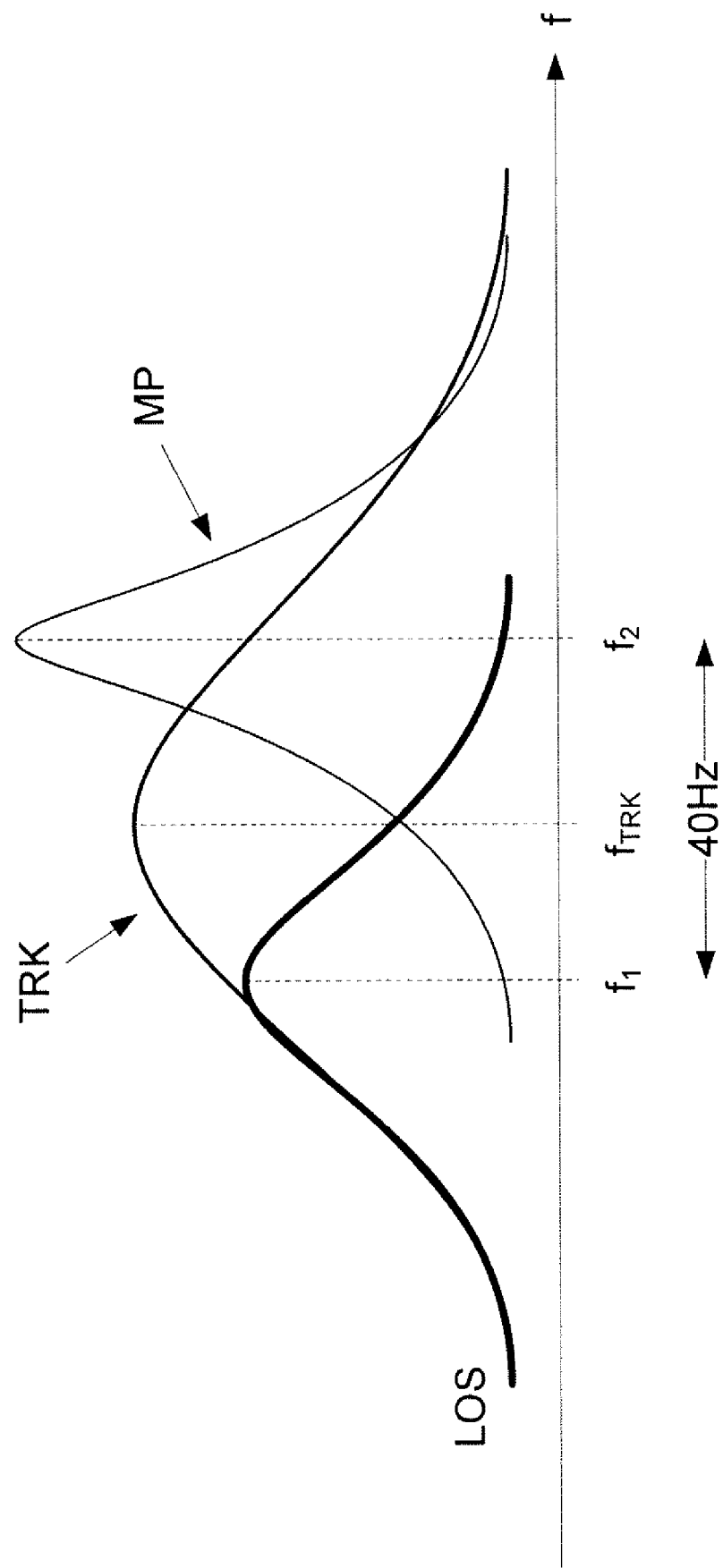
FIG. 1 is a signal diagram of an LOS signal, an MP signal and a tracking (TRK) signal.
Figure 2:
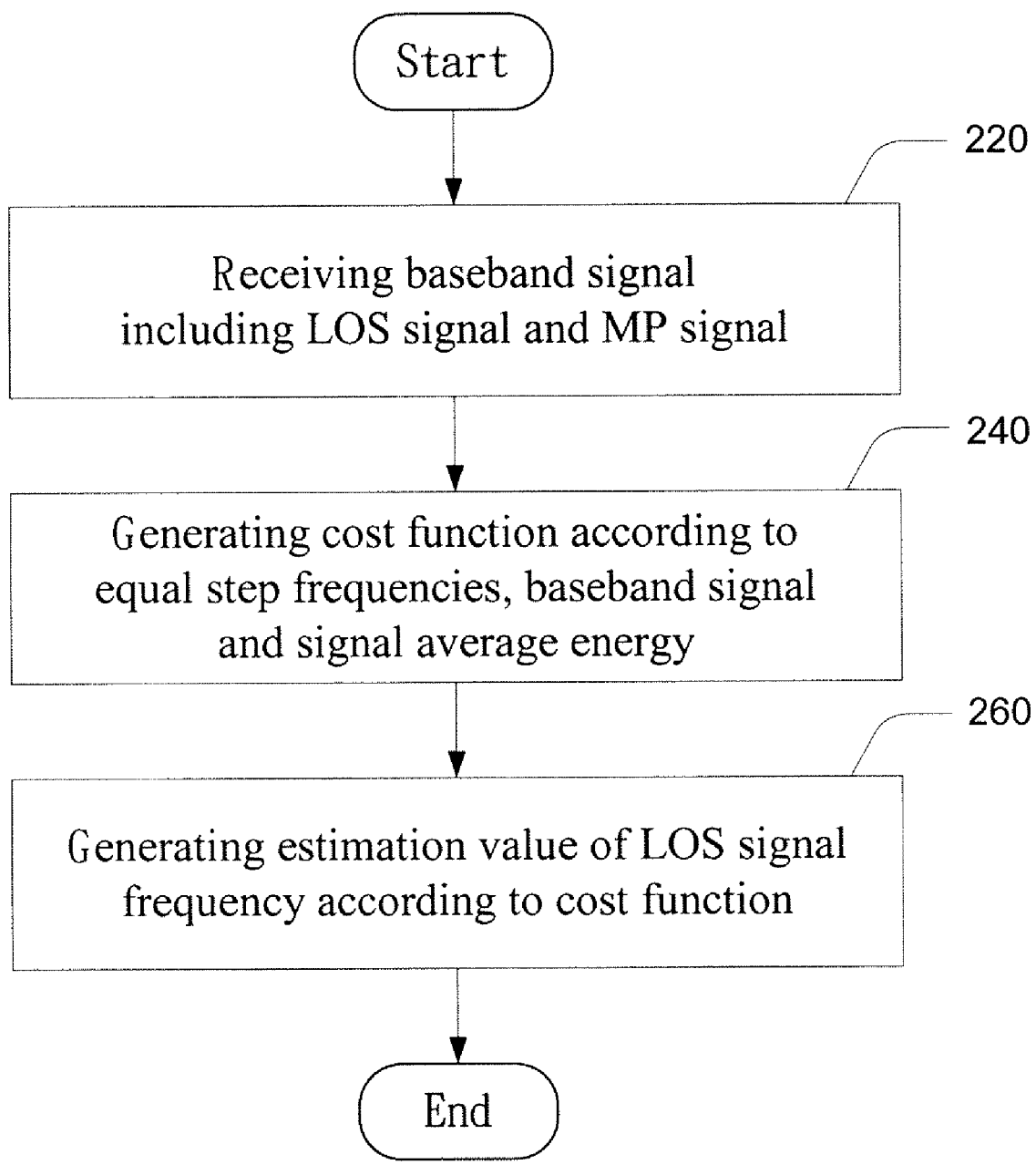
FIG. 2 is a flowchart of a frequency tracking method applied to a positioning system according to one embodiment of the present invention.

FIG. 2 is a flowchart of a frequency tracking method applied to a positioning system according to one embodiment of the present invention. In Step 220, a multipath, such as two-path, baseband signal including a line of sight (LOS) signal and a multipath (MP) signal is received. The two-path baseband signal can be represented as: $r(t)=A_1 c(\tau-\tau_1)e^{j(2\pi f_1 t+\theta_1)}+A_2 c(t-\tau_2)e^{j(2\pi f_2 t+\theta_2)}$, where $c(\tau)$ is a coarse acquisition (C/A) code, $A_1$, $f_1$, $\tau_1$ and $\theta_1$ represent a signal strength (amplitude), a frequency, a delay and a phase of the LOS signal respectively, and $A_2$, $f_2$, $\tau_2$ and $\theta_2$ represent a signal strength (amplitude), a frequency, a delay and a phase of the MP signal respectively.

In this embodiment, according to a coherent time T, a correlation is calculated by a time-and-carrier recovered correlation of the baseband signal within a time interval from $(k-1)T$ to $kT$, and a successive time correlation result is as follows:

$$s_k(\tau, f) = \int_{(k-1)T}^{kT} r(t) \cdot c(t-\tau) \cdot e^{-j2\pi f t} dt = (A_1 R(\tau-\tau_1)\mathrm{sinc}((f-f_1)T))^2 + (A_2 R(\tau-\tau_2)\mathrm{sinc}((f-f_2)T))^2 + 2A_1 A_2 \cos(2\pi f_\Delta kT + \theta_\Delta) R(\tau-\tau_1)R(\tau-\tau_2)\mathrm{sinc}((f-f_1)T)\mathrm{sinc}((f-f_2)T),$$

where $f_\Delta = f_1 - f_2$, $\theta_\Delta = \theta_1 - \theta_2 - \pi f_\Delta T$ and $R(\tau)$ is an autocorrelation function of the C/A code.

Then, the successive time correlation result $s_k(\tau,f)$ in K number of intervals T are accumulated, $k=0, 1, \ldots, K-1$, and the accumulated correlation results are averaged as follows:

$$P(\tau, f) = \frac{1}{K}\sum_{k=0}^{K-1} s_k(\tau, f) = P_S + P_N, \text{ where}$$

$$P_S = (A_1 R(\tau-\tau_1) \cdot \mathrm{sinc}((f-f_1)T))^2 + (A_2 R(\tau-\tau_2) \cdot \mathrm{sinc}((f-f_2)T))^2 \text{ and}$$

$$P_N = 2A_1 A_2 R(\tau-\tau_1)R(\tau-\tau_2)\mathrm{sinc}((f-f_1)T)\mathrm{sinc}((f-f_2)T)\cos(\pi(K-1)f_\Delta T + \theta_\Delta)\frac{\mathrm{sinc}(Kf_\Delta T)}{\mathrm{sinc}(f_\Delta T)}.$$

From the above two equations, the following inequality is obtained:

$$|P_N| \leq 2A_1 A_2 R(\tau-\tau_1)R(\tau-\tau_2)\mathrm{sinc}((f-f_1)T)\mathrm{sinc}((f-f_2)T) \cdot \gamma(f_\Delta T, K), \text{ where}$$

$$\gamma(\omega, K) = \left|\frac{\mathrm{sinc}(K\omega)}{\mathrm{sinc}(\omega)}\right| \text{ and} \quad (3)$$

$$\mathrm{sinc}(x) = \sin(\pi x)/\pi x.$$

From Eq. (3), $\gamma(\omega, K)$ is a periodic function to $\omega$ ($\omega = 2\pi f$), and the period is 1, i.e., $\gamma(\omega+Z, K) = \gamma(\omega, K)$, where z is an integer.

And, $\gamma(\omega, K)$ is also a symmetric function, i.e., $\gamma(-\omega, K) = \gamma(\omega, K)$. When $\omega$ is in the interval $[0, 0.5]$, an upper bound of Eq. (3) is considered as follows:

$$\gamma(\omega, K) = \frac{1}{K}\left|\frac{\sin(\pi K \omega)}{\sin(\pi \omega)}\right| \leq \frac{1}{K}\frac{1}{\sin(\pi \omega)}.$$

When $\omega$ is in the interval $[0, 0.5]$, the above upper bound is a strictly decreasing function. Hence, if $2/K \leq \omega \leq 0.5$, then $$\gamma(\omega, K) < \gamma\left(\frac{2}{K}, K\right) \leq \frac{1}{K}\frac{1}{\sin(\pi 2/K)} = \frac{1}{2\pi}\frac{1}{\mathrm{sinc}(2/K)}.$$

Figure 3:
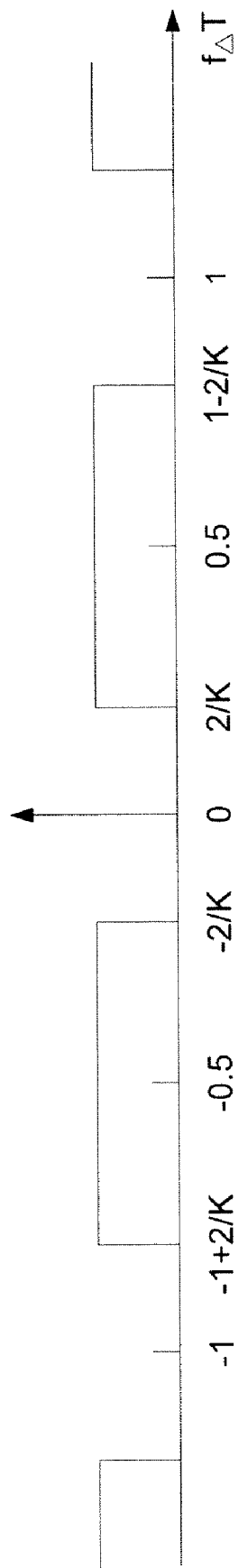
FIG. 3 is an interval diagram representing the inequality condition according to one embodiment of the present invention.

FIG. 3 is an interval diagram representing the inequality condition according to one embodiment of the present invention. As FIG. 3 shows, if the frequency difference matches the following condition:

$$|(f_\Delta T)_1 - 0.5| \leq 0.5 - \frac{2}{K}, \text{ then}$$

$$\gamma(f_\Delta T, K) < \frac{1}{2\pi \cdot \mathrm{sinc}(2/K)}.$$

Therefore, $$\frac{P_S^2}{P_N^2} \geq \frac{[(A_1 R(\tau-\tau_1) \cdot \mathrm{sinc}((f-f_1)T))^2 + (A_2 R(\tau-\tau_2) \cdot \mathrm{sinc}((f-f_2)T))^2]^2}{[2A_1 A_2 R(\tau-\tau_1)R(\tau-\tau_2)\mathrm{sinc}((f-f_1)T)\mathrm{sinc}((f-f_2)T) \cdot \gamma(f_\Delta T, K)]^2} \geq \frac{1}{\gamma(f_\Delta T, K)^2} \geq 4\pi^2 \cdot \mathrm{sinc}^2\left(\frac{2}{K}\right).$$

From the above equation, as K gets greater, $P_N$ can be ignored, and the tolerable frequency difference range also becomes larger. Hence, the signal-to-noise ratio (SNR) of the baseband signal is associated with the number of times of accumulation. For example, when K=10, the SNR of $P_S^2/P_N^2$ is at least 34.55. Therefore, an important result is obtained as follows:

$$P(\tau,f) \cong (A_1 R(\tau-\tau_1)\text{sinc}((f-f_1)T))^2 + (A_2 R(\tau-\tau_2)\text{sinc}((f-f_2)T))^2 = P_S.$$

A time delay reference $\tilde{\tau}$ is introduced to the above equation as follows:

$$P(\tilde{\tau}, f) = (A_1 R(\tilde{\tau} - \tau_1)\text{sinc}((f - f_1)T))^2 + \qquad (4)$$
$$(A_2 R(\tilde{\tau} - \tau_2)\text{sinc}((f - f_2)T))^2$$
$$= a_1 \text{sinc}^2((f - f_1)T) + a_2 \text{sinc}^2((f - f_2)T),$$

where first and second correlation coefficients $a_i = A_i^2 R^2(\tilde{\tau} - \tau_i)$, i=1, 2, $A_i$, and $\tau_i$ represent the signal strength (amplitude) and the delay of the LOS signal (i=1) and the MP signal (i=2) respectively, and $R(\tau)$ is the autocorrelation function of the C/A code. Accordingly, the first and the second correlation coefficients are associated with the signal strength and the delay of the LOS signal and the MP signal respectively as well as the autocorrelation function of the C/A code. Furthermore, from Eq. (4), the signal average energy is generated according to the time delay reference, the coherent time and the number of times of accumulation. And, Eq. (4) leaves four unknowns, i.e., the four parameters, $\{a_1, a_2, f_1, f_2\}$, which can then be estimated.

Further, the equal interval frequencies $\tilde{f}_n$, n=1, 2, ..., N are correlatively calculated respectively to obtain $P(\tilde{\tau}, \tilde{f}_n)$, and $P(\tilde{\tau}, \tilde{f}_n)$ are summed up to generate accumulative energy E as follows:

$$E \equiv \sum_{n=1}^{N} P(\tilde{\tau}, \tilde{f}_n)$$
$$= \sum_{n=1}^{N} a_1 \text{sinc}^2((\tilde{f}_n - f_1)T) + a_2 \text{sinc}^2((\tilde{f}_n - f_2)T).$$

Supposing the accumulation range of the equal interval frequencies covers $f_1$ and $f_2$, the equation below can be further derived from the above:

$$E \approx a_1 \sum_{n=-\infty}^{\infty} \text{sinc}^2((\tilde{f}_n - f_1)T) + a_2 \sum_{m=-\infty}^{\infty} \text{sinc}^2((\tilde{f}_n - f_2)T) \qquad (5)$$

By Parseval's theorem, it is understood that $$\sum_{n=-\infty}^{\infty} |x[n]|^2 = \frac{1}{2\pi} \int_{-\pi}^{\pi} |X(e^{j\omega})|^2 d\omega$$

where $X(e^{j\omega})$ is discrete-time Fourier transform of $x[n]$; therefore, $$\sum_{n=-\infty}^{\infty} \text{sinc}^2((\tilde{f}_n - f_k)T) = \frac{1}{2\pi} \int_{-\pi}^{\pi} \left| \frac{1}{f_{step}T} \cdot rect\left(\frac{\omega}{2 f_{step} T \pi}\right) \right|^2 d\omega$$
$$= \frac{1}{f_{step}T} \text{ for } k = 1, 2., \text{ where}$$

$$rect(t) = \begin{cases} 0, & |t| > 1/2 \\ 1/2, & |t| = 1/2 \\ 1, & |t| < 1/2. \end{cases}$$

Hence, it is further inferred that Eq. (5) be represented as:

$$E \approx a_1 \frac{1}{f_{step}T} + a_2 \frac{1}{f_{step}T} = (a_1 + a_2) \frac{1}{f_{step}T},$$

where $f_{step}$ is the interval of the equal interval frequencies $\tilde{f}_n$, n=1, 2, ..., N. The above equation explains the relationship between the first correlation coefficient $a_1$ and the second correlation coefficient $a_2$. Therefore, the second correlation coefficient can be obtained by the accumulative energy and the first correlation coefficient as follows:

$$a_2 = E f_{step} T - a_1.$$

The above result is substituted into Eq. (4) to obtain $$P(\tilde{\tau}, \tilde{f}_n) = a_1 \text{sinc}^2((\tilde{f}_n - f_1)T) + (E f_{step} T - a_1)\text{sinc}^2((\tilde{f}_n - f_2)T).$$

From the above equation, the estimation is further simplified to contain three parameters, i.e., $\{a_1, f_1, f_2\}$.

In Step 240, a cost function is generated according to the equal step frequencies $\tilde{f}_n$, n=1, 2, ..., N, the baseband signal and the signal average energy $P(\tilde{\tau}, \tilde{f}_n)$. The cost function is defined as follows: $C(a_1, f_1, f_2) = \sum_{n=1}^{N} \{P(\tilde{\tau}, \tilde{f}_n) - [a_1 \text{sinc}^2((\tilde{f}_n - f_1)T) + (E f_{step} T - a_1)\text{sinc}^2((\tilde{f}_n - f_2)T)]\}^2$.

In Step 260, an estimated value of the LOS signal frequency is generated according to the cost function. One can use mathematical analysis, such as a three parametric dimensions search method or a non-linear least square method, to obtain:
$(\hat{a}_1, \hat{f}_1, \hat{f}_2)$=arg min $C(a_1, f_1, f_2)$, where $\hat{a}_1$, $\hat{f}_1$ and $\hat{f}_2$ represent the estimated value of the first correlation coefficient, the LOS signal frequency and the MP signal frequency of the cost function $C(a_1, f_1, f_2)$ respectively, such that the estimated value of the cost function $C(a_1, f_1, f_2)$ is minimum. The embodiment can be realized in a receiver of a positioning system, such as a GPS, to solve the frequency offset and inaccurate range-rate caused by the MP signal.

Figure 4:
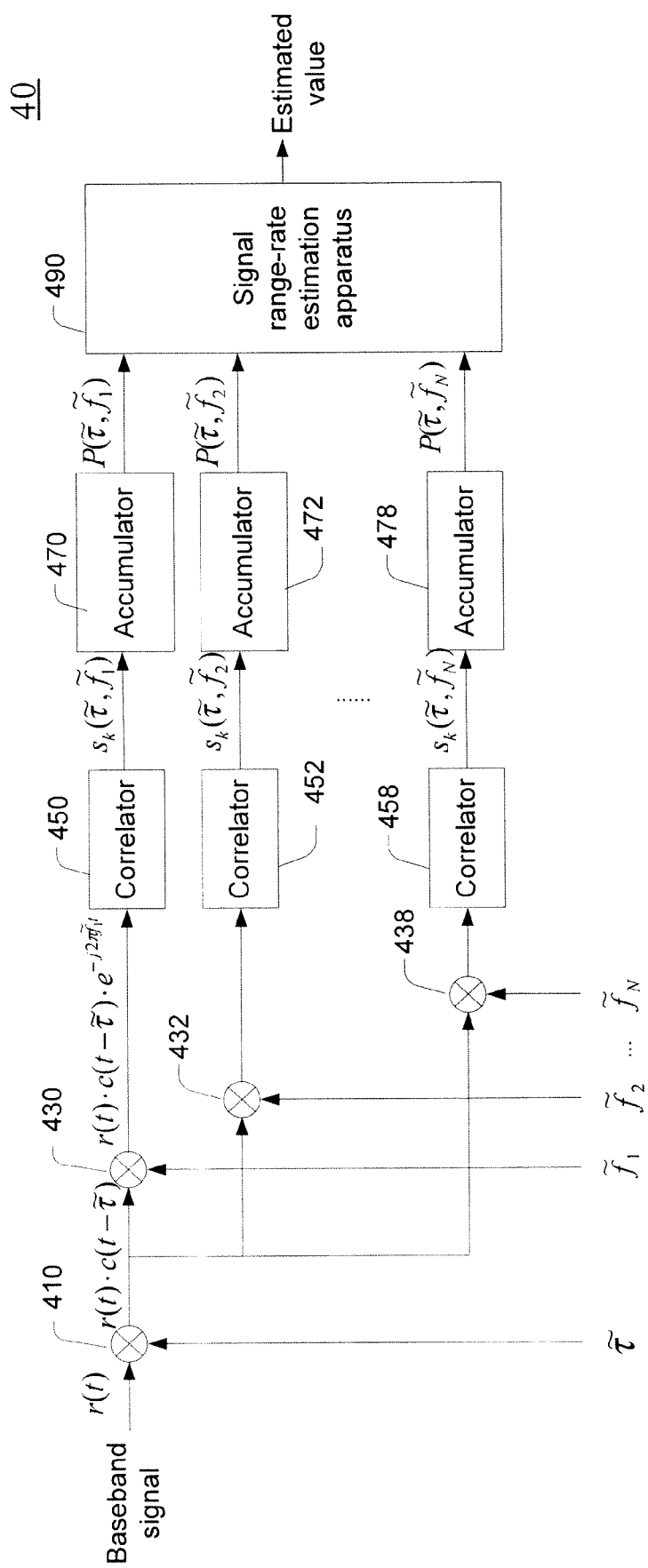
FIG. 4 is a block diagram of a frequency tracking apparatus applied to a positioning system according to one embodiment of the present invention.

FIG. 4 is a block diagram of a frequency tracking apparatus 40 applied to a positioning system according to one embodiment of the present invention. The frequency tracking apparatus 40 comprises multipliers 410, 430, 432, ..., and 438, correlators 450, 452, ... and 458, accumulators 470, 472, ... and 478 and a signal range-rate estimation apparatus 490. The signal range-rate estimation apparatus 490 can be realized by hardware, such as realized by an 8051 processor, and can also be realized by software.

In FIG. 4, the baseband signal r(t) is inputted. The baseband signal comprises the LOS signal and the MP signal. The baseband signal is multiplied by a time reference point $\tilde{\tau}$ via the multiplier 410 to obtain $r(t) \cdot c(t-\tilde{\tau})$ and then is further multiplied by a series of equal step frequencies $\tilde{f}_n$, n=1, 2, ..., N via N multipliers 430, 432, ..., and 438 respectively to obtain $r(t) \cdot c(t-\tilde{\tau}) \cdot e^{-j2\pi \tilde{f}_n t}$.

According to the coherent time T and the number of times of accumulation K, the above mentioned baseband signal goes through N correlators 450, 452, ..., and 458 and a time-and-carrier recovered correlation is done within a time interval from (k−1)T to kT, and an integration energy result is as follows:

$$\int_{(k-1)T}^{kT} r(t) \cdot c(t-\tilde{\tau}) \cdot e^{-j2\pi \tilde{f}_n t} dt.$$

Accordingly, a successive time correlation result $s_k(\tilde{\tau}, \tilde{f}_n)$, k=0, 1, ..., K−1, n=1, 2, N is generated. The baseband signal goes through N correlators 470, 472, ..., and 478 respectively to generate the signal average energy $P(\tilde{\tau}, \tilde{f}_n)$, n=1, 2, ..., N. The result is transmitted to the signal range-rate estimation apparatus 490 to generate the parameters $\hat{a}_1$, $\hat{f}_1$ and $\hat{f}_2$ wherein $\hat{a}_1$, $\hat{f}_1$ and $\hat{f}_2$ are the estimated value of the first correlation coefficient, the LOS signal frequency and the MP signal frequency.

Figure 5:
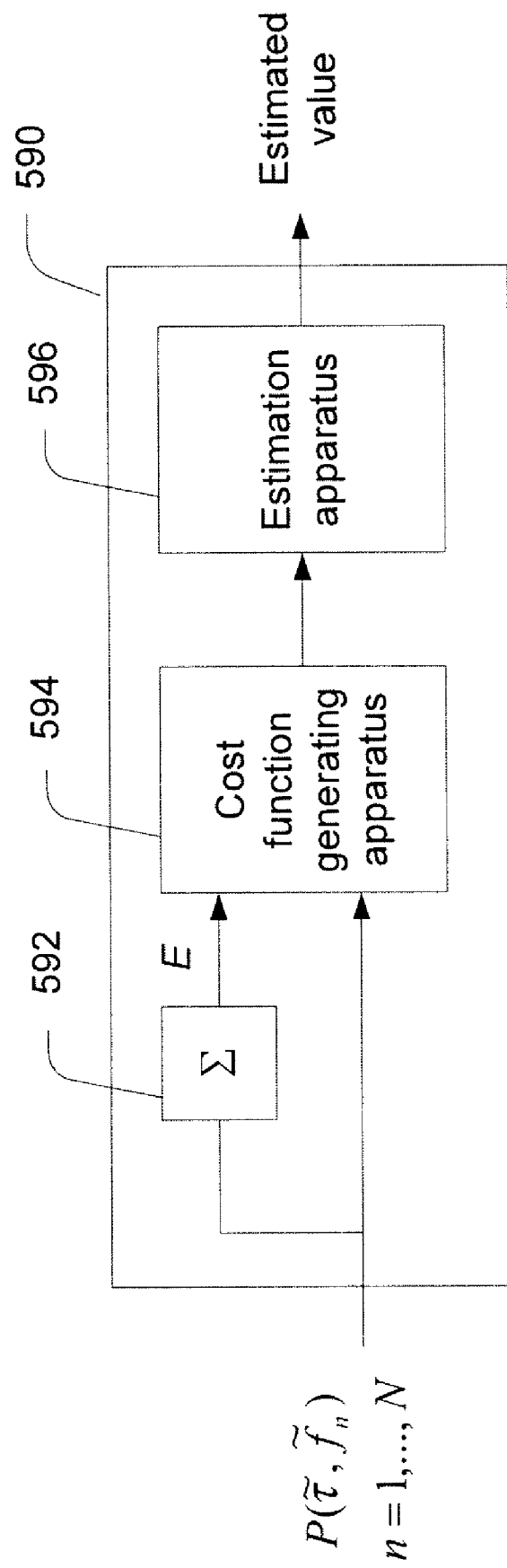
FIG. 5 is a block diagram of a signal range-rate estimation apparatus according to one embodiment of the present invention.

FIG. 5 is a block diagram of a signal range-rate estimation apparatus 590 according to one embodiment of the present invention. The signal range-rate estimation apparatus 590 comprises an accumulator 592, a cost function generator 594 and an estimator 596. The signal average energy $P(\tilde{\tau}, \tilde{f}_n)$, n=1, 2, . . . , N is inputted to the signal range-rate estimation apparatus 590, and then the signal average energy $P(\tilde{\tau}, \tilde{f}_n)$, n=1, 2, . . . , N passes through the accumulator 592 to generate the accumulative energy $E = \tau_{n=1}^{N} P(\tilde{\tau}, \hat{f}_n)$.

The signal average energy $P(\tilde{\tau}, \tilde{f}_n)$ and the accumulative energy E are inputted to the cost function generator 594 to generate the cost function $C(a_1, f_1, f_2)$ as follows: $C(a_1, f_1, f_2) = \Sigma_{n=1}^{N} \{P(\tilde{\tau}, \tilde{f}_n) - [a_1 \operatorname{sinc}^2((\tilde{f}_n - f_1)T) + (Ef_{step}T - a_1)\operatorname{sinc}^2((\tilde{f}_n - f_2)T)]\}^2$, where $a_1$ is the first correlation coefficient, $f_1$ is the LOS signal frequency, $f_2$ is the MP signal frequency, $P(\tilde{\tau}, \tilde{f}_n)$ is the signal average energy, $\tilde{f}_n$ is the equal step(interval) frequency, T is the coherent time, E is the accumulative energy, and $f_{step}$ is the interval.

The cost function $C(a_1, f_1, f_2)$ is inputted to the estimator 596 to generate the estimated parameter $\hat{a}_1$, $\hat{f}_1$ and $\hat{f}_2$, where $\hat{a}_1$, $\hat{f}_1$ and $\hat{f}_2$ are the estimated values of the first correlation coefficient, the LOS signal frequency and the MP signal frequency respectively.

Figure 6:
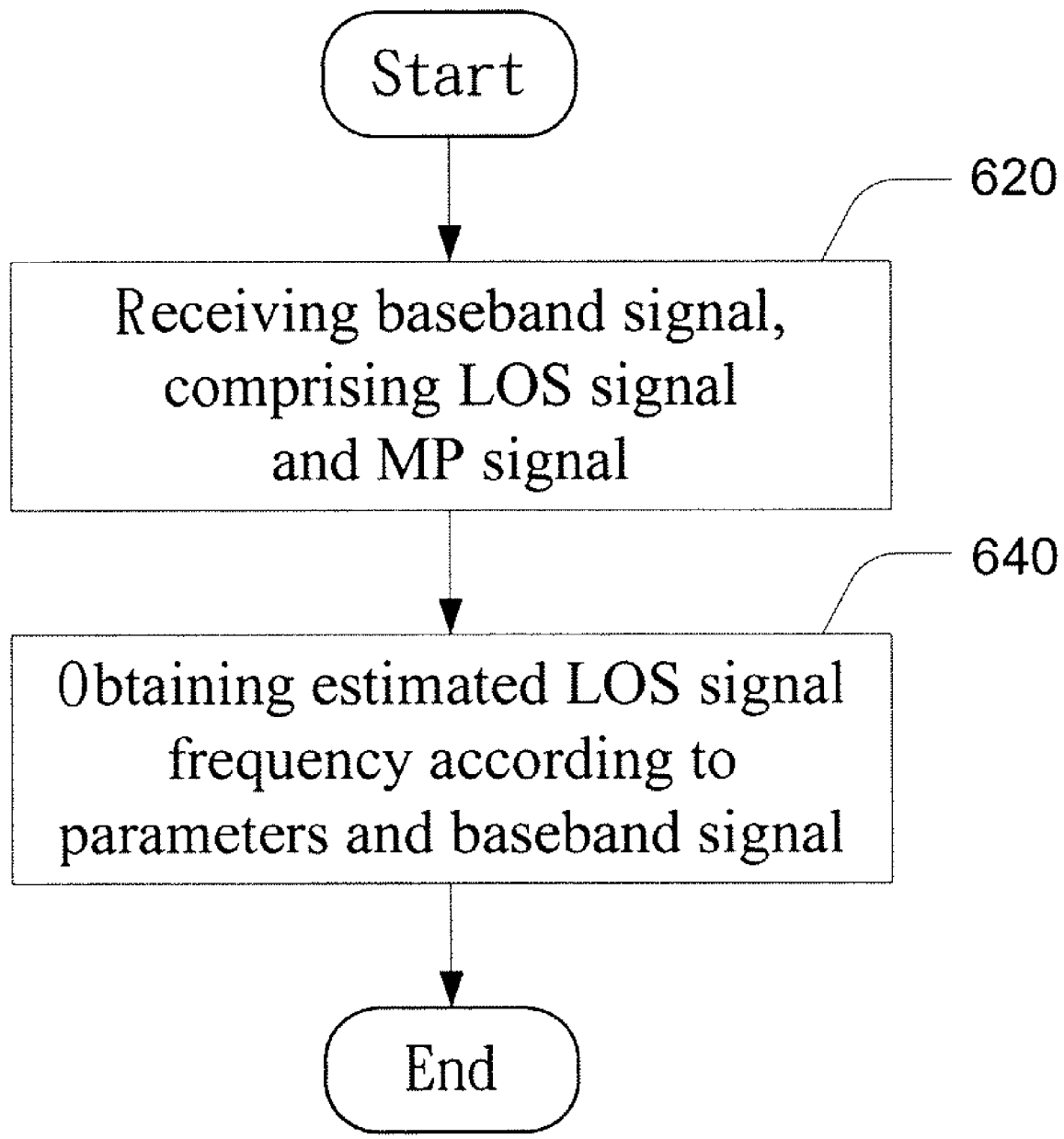
FIG. 6 is a flowchart of a frequency tracking method applied to a positioning system according to another embodiment of the present invention.

FIG. 6 is a flowchart of a frequency tracking method applied to a positioning system according to another embodiment of the present invention. In Step 620, a two-path baseband signal including an LOS signal and an MP signal is received. In Step 640, an estimated LOS signal frequency is generated according to a plurality of parameters and the baseband signal. The parameters can be the three parameters disclosed in the above embodiment, namely a first correlation coefficient, the LOS signal frequency and the MP signal frequency. Alternatively, other additional parameters can be used for operation. For example, a second correlation coefficient can be utilized as a fourth estimation parameter, and the additional parameters can be generated by a plurality of equal step frequencies. It is noted that the more parameters involve the more calculation it costs; as a result, may impose significant effects on power consumption of the portable device.

Figure 7:
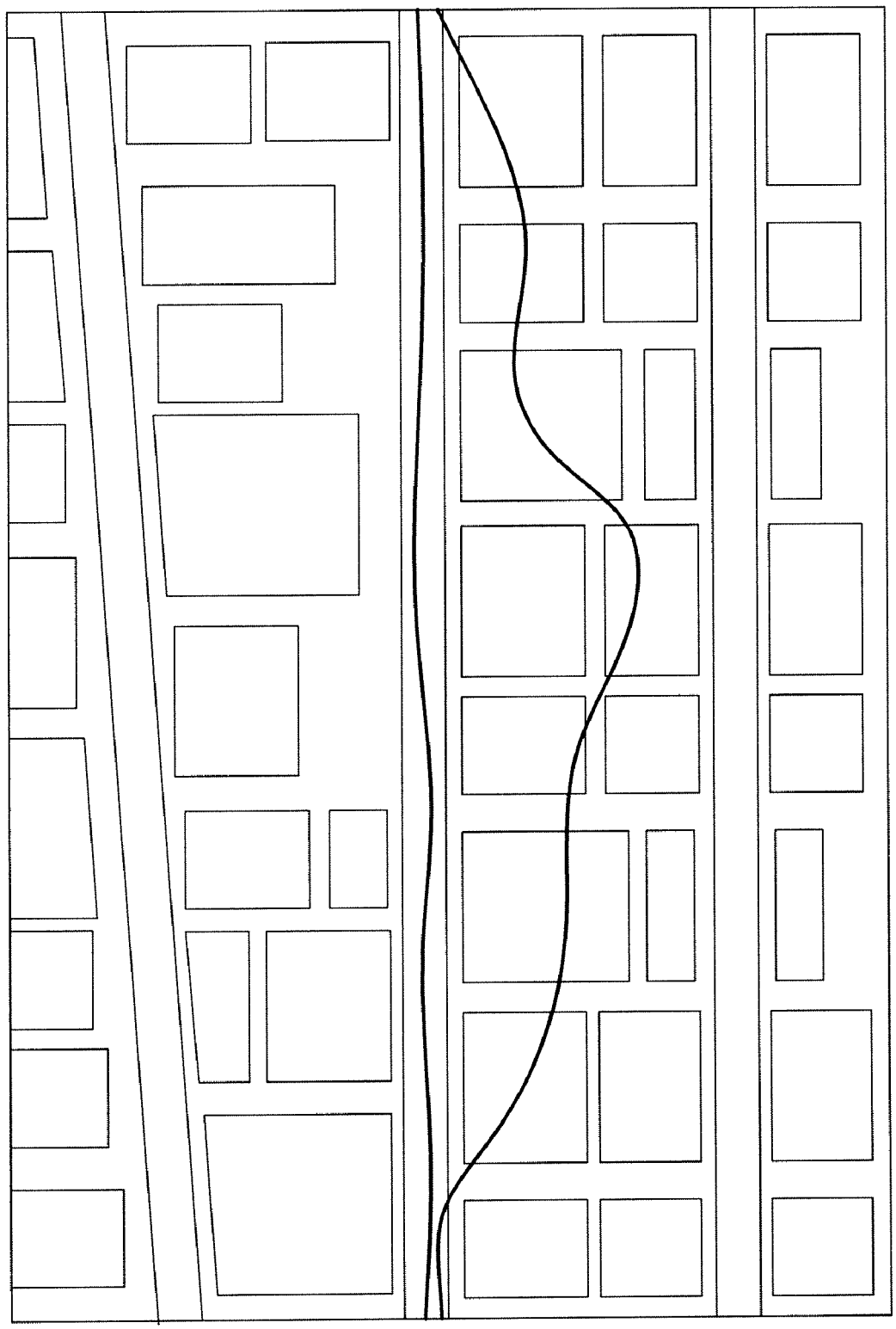
FIG. 7 is a navigating route experimental diagram according to one embodiment of the present invention versus the prior art.

FIG. 7 is a schematic diagram of an experimental navigating route according to one embodiment of the present invention versus that of the prior art. The white line is the navigating route simulated according to the embodiment of the present invention, while the crooked black line is the navigating route according to the prior art. As observed from the diagram, the navigating route simulated according to the embodiment is closer to the actual route and is more accurate than the navigating route according to the prior art.

With the description of the foregoing embodiments, the invention discloses a novel frequency tracking method and apparatus applied in the GPS system for attending to the characteristic of the frequency difference between the LOS signal and the MP signal, so as to make the navigating route of the positioning system, such as GPS, more accurate.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A frequency tracking method applied to a positioning system, the method comprising:

receiving a baseband signal by an antenna, the baseband signal having a line of sight (LOS) signal from a satellite and a multipath (MP) signal from reflections of obiects on earth around the antenna, generating a cost function according to the baseband signal and an energy of signal, wherein the energy of signal is generated according to a time delay reference, a coherent time, and a number of times of accumulation, a signal to noise ratio of the baseband signal is related to the number of times of accumulation: and generating an estimated LOS signal frequency according to the cost function.

2. The method according to claim 1, wherein the energy of signal is an average energy of signal.

3. The method according to claim 2, further comprising generating an accumulative energy according to the energy of signal.

4. The method according to claim 3, wherein the step of generating the accumulative energy comprises accumulating in a range of frequencies of an equal interval wherein the range covers the estimated LOS signal frequency and a MP signal frequency of the MP signal.

5. The method according to claim 1, wherein the step of generating the estimated LOS signal frequency estimates a plurality of parameters by using a search method for a plurality of parametric dimensions or a non-linear least square method.

6. The method according to claim 1, wherein the step of generating the estimated LOS signal frequency further comprises generating the estimated LOS signal frequency by using a plurality of parameters, the parameters comprising a multipath signal frequency of the MP signal and a correlation coefficient.

7. The method according to claim 6, wherein the correlation coefficient is associated with a signal strength and a delay of the LOS signal and an autocorrelation function of a coarse acquisition (C/A) code.

8. The method according to claim 1, wherein the step of generating a cost function generates the cost function further according to a plurality of frequencies having equal intervals.

9. A frequency tracking apparatus applied to a positioning system, the frequency tracking apparatus receiving a baseband signal, comprising:

a first multiplier, for multiplying the baseband signal with a time delay reference;

a plurality of second multipliers, coupled to the first multiplier, for multiplying the baseband signal with a plurality of frequencies of equal interval;

a plurality of correlators, coupled to the second multipliers respectively;

a plurality of accumulators, coupled to the correlators respectively, for generating an energy of signal; and a signal range-rate-estimation apparatus, coupled to the accumulators, for generating an estimated parameter according to the energy signal, comprising:

a cost function generator, for generating a cost function; and an estimator, coupled to the cost function generator, for generating the estimated parameter according to the cost function.

10. The apparatus according to claim 9, wherein the signal range-rate estimation apparatus is a processor.

11. The apparatus according to claim 9, wherein the signal range-rate estimation apparatus further comprises an accumulator, coupled to the cost function generator, for generating an accumulative energy.

12. The apparatus according to claim 9, wherein the cost function is associated with a plurality of parameters comprising a correlation coefficient, an LOS signal frequency and an MP signal frequency.

* * * * *